(12) United States Patent
Lee et al.

(10) Patent No.: US 7,031,529 B2
(45) Date of Patent: Apr. 18, 2006

(54) METHOD FOR DETECTION OPTIMIZATION IN IMAGE-BASED DECISION SYSTEMS (76) Inventors: Shih-Jong J. Lee, 15418 SE. 53rd Pl., Bellevue, WA (US) 98006; Chi-Chou Huang, 9610 179th Pl. NE. #2, Redmond, WA (US) 98052; Seho Oh, 5025 145th Pl. SE., Bellevue, WA (US) 98006

( * ) Notice: Subject to any disclaimer, the term of this patent is extended or adjusted under 35 U.S.C. 154(b) by 787 days.

(21) Appl. No.: 10/178,166

(22) Filed: Jun. 24, 2002

(65) Prior Publication Data

US 2003/0235324 A1 Dec. 25, 2003

(51) Int. Cl.
*G06K 9/68* (2006.01)
(52) U.S. Cl. .................. 382/226; 382/149
(58) Field of Classification Search .......... 382/141, 382/143, 226, 147, 151, 149, 152, 181; 29/832; 250/282; 435/69.1; 436/514
See application file for complete search history.

(56) References Cited

U.S. PATENT DOCUMENTS

| | | | | | |
|---|---|---|---|---|---|
| 5,818,443 A | * | 10/1998 | Schott | .................. | 382/141 |
| 5,846,838 A | * | 12/1998 | Chandler | .................. | 436/514 |
| 5,991,699 A | * | 11/1999 | Kulkarni et al. | .............. | 702/83 |
| 6,176,011 B1 | * | 1/2001 | Shirakawa | ................. | 29/832 |
| 6,635,872 B1 | * | 10/2003 | Davidson | .................. | 250/307 |

* cited by examiner

*Primary Examiner*—Sheela Chawan (57) ABSTRACT

A systematic way of linking structure constraints of components of a common object and checking and resolving their inconsistency is used to improve detection results in image-based decision systems. A multilevel Chain-And-Tree (CAT) model is used to direct processing using both forward and backward scans through the related components. Since components occur as parts of an object, the context (relational structure) in which the component appears can be used to reduce noise and variation affects. In the method, object knowledge is translated into constraints between components. The constraints are used to enhance feature detection, defect detection, and measurement accuracy and consistency.

9 Claims, 3 Drawing Sheets

METHOD FOR DETECTION OPTIMIZATION IN IMAGE-BASED DECISION SYSTEMS

TECHNICAL FIELD

This invention relates to a method for optimizing detection in image-based decision systems.

BACKGROUND OF THE INVENTION

An image-based decision system processes and extracts information from an image or multiple images to make decisions such as the presence of objects of interest, disease, defects; or the acceptance of measurement parameters such as dimensions, intensity, structures, etc. Image-based decision systems have broad applications such as machine vision, non-contact gauging, inspection, robot guidance, medical imaging, biometrics, vision-guided information appliance, etc.

Many image-based decision functions involve the detection of defects or gauging of dimensions from man-made manufacturing components, parts or systems. Filtering, thresholding, template matching, golden template comparison and caliper based edge detection are the primary prior art approaches for performing simple machine vision inspection and measurement tasks (Silver, B, "Geometric Pattern Matching for General-Purpose Inspection in Industrial Machine Vision", Intelligent Vision '99 Conference—Jun. 28–29, 1999.).

There is often a teaching phase and an application phase for an image-based decision system. In the prior art approach, template region(s)or a golden template is selected by a human and stored in the system in the teaching phase. In addition, edge detection calipers are specified at image regions of interest for edge detection through multiple one-dimensional projection and simple differentiation. In the application phase, template search is applied to locate the template region(s) in the input image. The located template locations are used to establish a reference coordinate system and/or for deriving points and structures for measurements. Edges are detected from each caliper region and/or the golden template is subtracted from the normalized input image for defect detection or dimensional measurements (Hanks, J, "Basic Functions Ease Entry Into Machine Vision", Test & Measurement World, Mar. 1, 2000 http://www.e-insite.net/tmworld/index.asp?layout=article&articleid=CA187377&pubdate=3/1/2000, Titus, J, "Software makes machine vision easier", Test & Measurement World, Oct. 15, 2001 http://www.e-insite.net/tmworld/index.asp?layout=article&articleid=CA177596&pubdate=10/15/2001)

In objects with many components, there is no systematic way of separating variation effects of each component in the prior art approaches. Each component of an object is detected by a local based processing method that detects local features without taking into account the features detected from other components of the object. This isolated local detection result is easily degraded by noise and variations. This leads to inaccurate measurements, inconsistent results, missed defects or false alarms. Therefore, in order to accommodate components with large variations, defects in components with small variations may be missed. Conversely, in order to detect defects in components with small variations, false alarms may be detected from components with large variations. Furthermore, in objects with many components, there is no systematic way of separating affects of each component in the prior art approaches. Therefore, a defective component in an object may hinder the ability of the inspection system to properly inspect the other components of the object.

Prior art approaches do not have a systematic way of linking structure constraints of components of a common object and checking and resolving their inconsistency. For example, a line component 1 is designed to be parallel to a line component 2. When a 10 degree rotation is detected in line component 1, line component 2 is assumed to be rotated by 10 degrees as well. If the measured rotation angle of line component 2 does not match that of line component 1, a method of conflict resolution and estimate refinement should be provided. This is not included in the prior art framework. A special application dependent ad-hoc approach is sometimes used in the prior art if the structure linkage is desirable.

Increasing quality and precision requirements in advanced manufacturing demands that quality control procedures be implemented at every stage of the manufacturing process. This requires advanced inspection applications to be deployed on the factory floor by users who have little or no knowledge of image processing/pattern recognition/machine vision technology. Simple prior art algorithms cannot properly address these requirements. There are growing demands for new solutions for image-based decisions. The new solution should allow use of application knowledge to optimize the detection results.

A multilevel Chain-And-Tree (CAT) model was disclosed for image based decision in Lee, S., Huang, C., entitled "A Multilevel Chain-And-Tree Model for Image-based Decisions", ("CATID") U.S. patent application Ser. No. 10/104,669, filed Mar. 22, 2002, which is incorporated in its entirety herein. It provides a framework to facilitate highly effective analysis and measurement for advanced image based decision.

Since components occur as parts of an object, the context (i.e. relational structure) in which the component appears can be used to reduce noise and variation affects. In the CATID method, object knowledge is translated into constraints between components. The constraints are used to enhance feature detection, measurement accuracy, defect detection and consistency. Use of constraints achieves robust results for image-based decisions.

A major advantage of the CAT model is the ability to link components through pair-wise relations. The component linking allows the refinement of local detection of a CAT node component using the detection results of all other CAT nodes. The pair-wise serial component relations allow very efficient optimization procedures that optimizes all detection results using all relations. Therefore, the CAT model detection results and defect detection from all components are considered before rendering the final detection results of a component even though the relations from one component to most of the other components are indirect.

OBJECTS AND ADVANTAGES

This invention provides methods for linking the structure constraints of the components of a common subject and checking and resolving their inconsistency to enhance the integrated detection results. The primary objective of this invention is to provide a method that optimizes detection results using the detections and relations of all components in an object. Another objective of the invention is to enhance the detection result of a component through its relation to other components. A third objective of the invention is to separate variation effects of each component. A further objective of the invention is to remove a defect's affect on a component to other components in a common subject. An additional objective of this invention is to detect the defective components whose local features do not match the structure and features of other components.

Summary of the Invention

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

I. Concept

A multilevel Chain-And-Tree (CAT) model was disclosed for image based decision in Lee, S, Huang, C "A Multilevel Chain-And-Tree Model for Image-based Decisions", ("CATID") U.S. patent application Ser. No. 10/104,66, filed Mar. 22, 2002, which is incorporated in its entirety herein. It provides a framework to facilitate highly effective analysis and measurement for advanced image-based decision.

Since components occur as parts of an object, the context (i.e. relational structure) in which the component appears can be used to reduce noise and variation affects. In the CATID method, object knowledge is translated into constraints between components. The constraints are used to enhance feature detection and measurement accuracy and consistency. Use of constraints achieves robust results for image-based decisions.

A major advantage of the CAT model is the ability to link components through pair-wise relations. The component linking allows the refinement of local detection of a CAT node component using the detection results of all other CAT nodes. The pair-wise relations allow very efficient optimization procedures that optimize all detection results using all relations. Therefore, the CAT model detection results from all components are considered before rendering the final detection results of a component even though the relations from one component to most of the other components are indirect.

II. Overview

Figure 1:
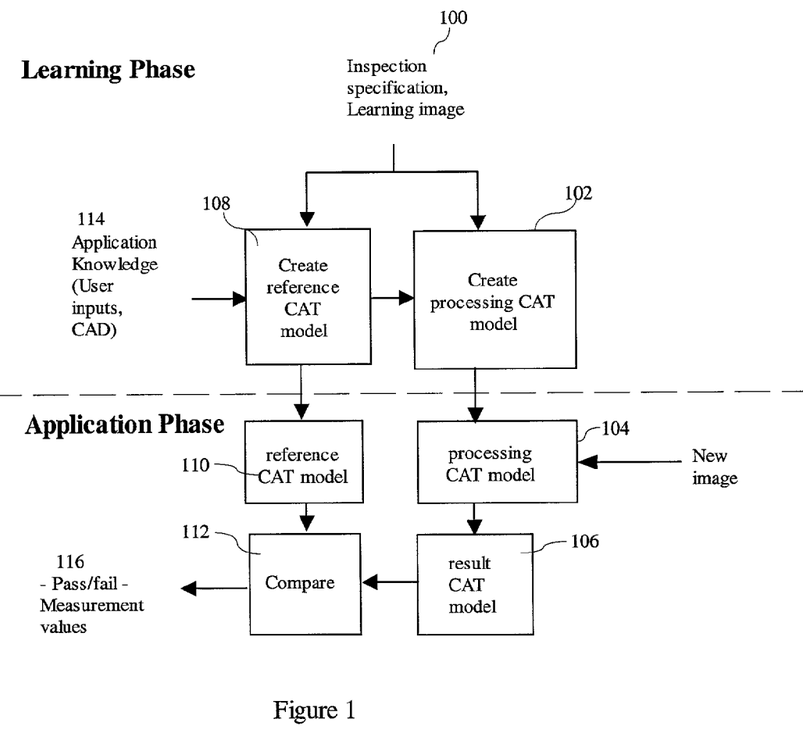
FIG. 1 shows an application scenario of the CAT based ID system in one embodiment of the invention.

In one embodiment, the application scenario of this invention is shown in FIG. 1. As shown in FIG. 1, a reference CAT model 110 is created using inspection specification and/or learning image 100 and/or application knowledge 114 during the learning phase. The inspection specification 100 specifies the desired features for inspection and/or measurements. It could be specified by a user or automatically learned by the system after showing normal and defected images. The application knowledge could be a typical image of the subject, a Computer Aided Design (CAD) model of the subject or entered by a user through a user interface. The reference CAT model 110 consists of the basic structure and attribute values of an ideal subject and its tolerance ranges. A processing CAT model 104 is created from the reference CAT model 108 and/or the inspection specification and/or learning image 100 in the learning phase. The processing CAT model stores the processing algorithm and sequence that will be applied to a new image to create result CAT model 106 in the application phase.

A result CAT model 106 is used to represent the measurement results of a new image. The reference CAT model 110 and result CAT model 106 are compared 112 to determine the pass/fail status of the new image and/or measurement values of image features of interest 116. In one embodiment of the invention, the comparison 112 is a simple check of the measurement results stored in result CAT model against the tolerance ranges stored in the reference CAT model. A new image fails the inspection if any of its measurements is outside the tolerance range. Otherwise, it passes the inspection.

The processing CAT model 104 includes detection methods associated with the CAT component type. For example, caliper edge detection can be associated with a CAT component in a processing CAT model for the detection of a regular shape CAT component such as ring, circle, arc, square, rectangle, and line, etc. A template matching method can be associated with a CAT component in a processing CAT model for the detection of an arbitrary shape CAT component.

In addition, measurement methods are associated with CAT component features. For example, rotation angle, scale, area, shape, density measurement functions can be defined in a processing CAT model 104 to measure the desired features for the result CAT model. The processing CAT model 104 provides a framework to define and execute an image-based decision algorithm. This overcomes the prior-art difficulty of inconsistent ad-hoc algorithms. It also provides a direct link between algorithm representation and subject and result model 106 to facilitate easy comprehension, update, changes and debugging.

III. Multi-level CAT Model

Figure 2:
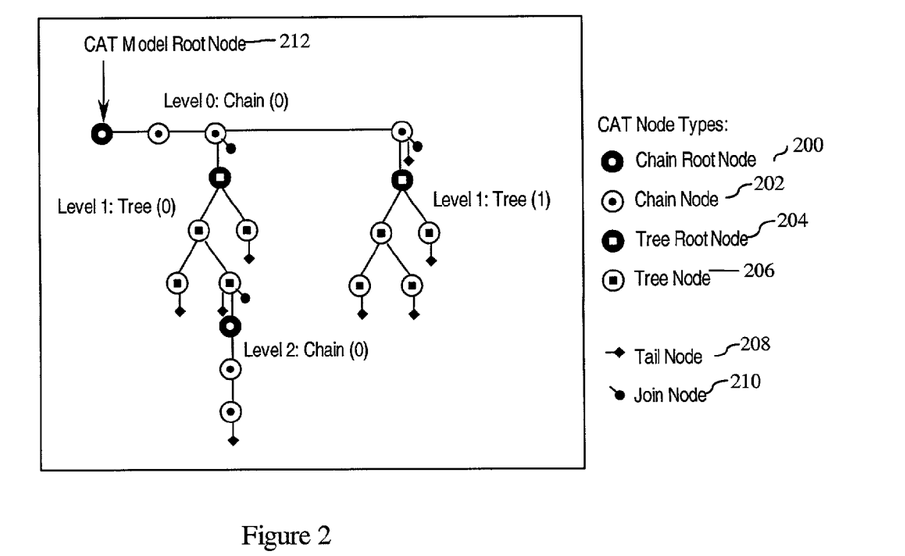
FIG. 2 shows a CAT model illustration.

A multi-level CAT model represents a subject by components and their relations at multiple levels. The relations between components are represented as a chain or a tree link. In one embodiment of the invention, the CAT model is illustrated in FIG. 2.

III.1 CAT Model Elements

A CAT model contains at least one CAT chain or one CAT tree. CAT chain and CAT tree consists of CAT nodes.

A. CAT node

A CAT node is the basic unit of a CAT model. In one embodiment of the invention, there are four different types of CAT nodes: (1) chain root node 200, (2) chain node 202, (3) tree root node 204, and (4) tree node 206. A CAT node is a Join node 210, if it connects to a chain root node or a tree root node at lower level. A CAT node is a Tail node 208, if it is the last chain node or a terminal node of a tree in a given level. All CAT nodes, except the model root node 212, have one parent node. Each chain node has one child node at the same level, if it is not a tail node 208. Each tree node 206 has one or more child nodes at the same level, if it is not tail node 208. Each CAT node has a "depth" attribute that represents the distance to its chain/tree root node. A root node has the depth of 0, and its children have the depth of 1, and so on.

B. CAT Chain and CAT Tree

A CAT chain contains at least one chain root node 200 plus one or more chain nodes 202. A CAT tree contains at least one tree root node 204 plus one or more tree nodes 206. Each CAT chain/tree has a "level" attribute that is the number of root nodes it has to pass through to reach the CAT model root node.

C. CAT Model

A CAT model contains at least one CAT chain or one CAT tree. Each CAT model has one model root node that is either a chain root node or a tree root node.

III.2 CAT Component Elements

As described above, a CAT model contains one or more CAT nodes. Each CAT node contains one CAT component that is a part of the real object described by the CAT model. In one embodiment of the invention, the CAT component for the reference CAT model and result CAT model can be specified by their type and attributes as well as their relations.

III.2.1 CAT Component Type

CAT components include simple geometric entities such as ring, circle, arc, square, rectangle, line, text, character, arbitrary shape, or a group of components/CAT.

Those skilled in the art should recognize that other component types could be defined including three-dimensional entities or parts specific to an application such as different types of IC-chips or screws, etc.

III.2.2 CAT Component Features

Each component has associated attributes or features such as location (centroid, bounding box, etc.), rotation angle, scale, 1-dimensional measurement (width, length, radius, etc.), 2-dimensional measurement (area, etc.), boundary points (link list, boundary point statistics), shape features (compactness, eccentricity, moments, Fourier descriptors, etc.), intensity features (mean density, standard deviation density, integrated density, etc.), texture features (co-occurrence statistics, run-length statistics, fractal dimension statistics, etc.), structure features for children components (number of components, average distance between components, etc.), text content or character value (for text or character components).

A reference CAT model 110 represents an ideal subject and its tolerances. Therefore, its feature attributes include not only the nominal values but also the tolerance ranges. Furthermore, it may store attributes such as template image or valid character sets (for a character component) to facilitate pass/fail decision. A result CAT model 106 represents an instance of the subject that is measured from the input image. Its feature attributes store the measured values. Additional attribute such as presence/absence of the component can also be included.

Those skilled in the art should recognize that other component features can be defined including color or three-dimensional features or features specific to an application.

III.2.3 CAT Component Relations

The relations between CAT nodes (such as CAT chains or CAT trees) can be represented by their links. The relations between CAT nodes are associated with the links. Since a CAT node can have only one parent yet it could have multiple children, the relations between nodes can be conveniently specified in the link between a CAT node to its parent node. Also, the relations among all children can be specified in their common parent. In one embodiment of the invention, the relations include without limitation:

Distance: The distance between two components
Adjacency: such as touching, overlapping, etc.
InsideOutside: such as inside, outside, etc.
Parallelism
Perpendicularity
Concentricity
BetweenAngle: The angle between component major axes of a child node and its parent node.
AreaRatio: The ratio between component areas of the child node and its parent node.
LengthRatio: The ratio between component major axis lengths of the child node and its parent node.

Those skilled in the art should recognize that other component relations could also be defined including color, three-dimensional relations or parts specific relations.

IV. Processing CAT Model

The processing CAT model stores the processing sequence to generate the elements of each CAT component in the result CAT model. A node in a processing CAT model stores detection functions for its CAT component, relation extraction functions to extract its CAT component relational features, detection optimization functions to optimize detection results using CAT component relations and results from related nodes. There are also measurement functions to extract its CAT component features.

Figure 3:
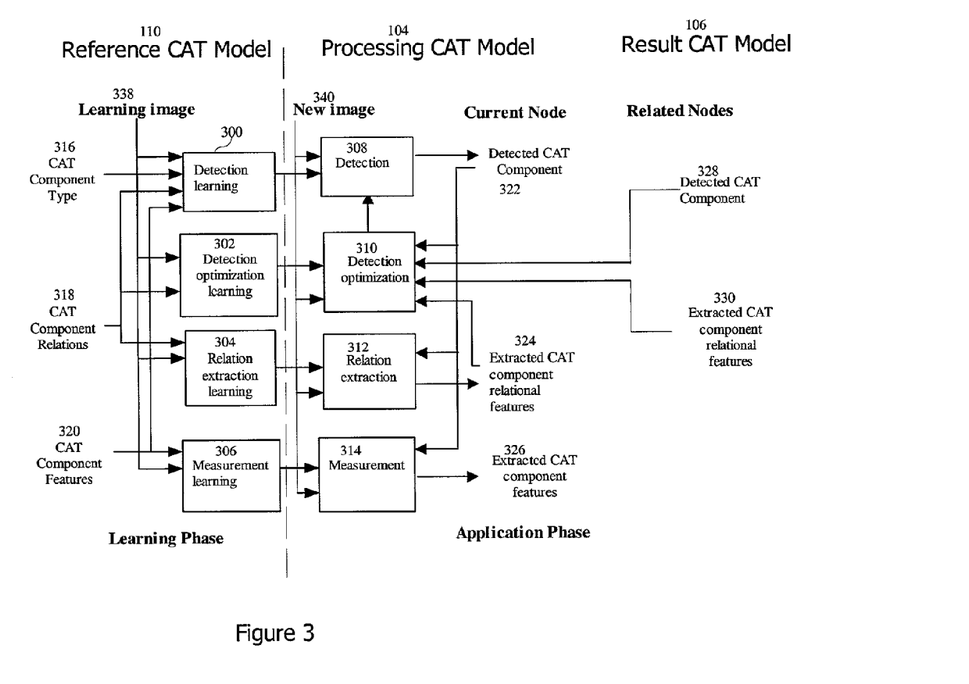
FIG. 3 shows a processing CAT model learning and application flow.

FIG. 3 shows the processing CAT model learning phase and application phase flow. It shows the relations between the processing CAT model 104 and reference CAT model 110 in the learning phase and the processing flow between the processing CAT model 104 and result CAT model 106 in the application phase. In the learning phase, the detection function for a CAT node is created by a detection learning module 300. This module uses the CAT component type 316 and CAT component relations 318 from the reference CAT model 110 as well as the learning image 338 and the CAT component features 320 to create a detection sequence 308 for the CAT node. The resulting detection function 308 is stored in the processing CAT model 332. A relation extraction learning module 304 uses the CAT component relations 318 from the reference CAT model and the learning image 338 to create relation extraction sequence 312 for the CAT node. The resulting relation extraction function 312 is stored in the processing CAT model. A detection optimization learning module 302 uses the CAT component relations 318 from the reference CAT model and the learning image 338 to create detection optimization processing sequence 310 for the CAT node. The resulting detection optimization function 310 is stored in the processing CAT model. A measurement learning module 306 uses the CAT component features 320 from the reference CAT model and the learning image 338 to create the measurement sequence 314 for the CAT node. The resulting measurement function 314 is stored in the processing CAT model 104.

In the application phase, the detection function for a given CAT node is applied to a new image 340 to initially detect 308 the component associated with the node and produce a detected CAT component 322. The relation extraction function 312 processes the detected CAT component 322 and new image 340 to extract CAT component relational features 324. The extracted CAT component relational features 324 and detected CAT component 322 of the current node and related nodes 328, 330 are processed by the detection optimization function 310 to refine the detection 308 and improve the detected CAT component 322 results using the relations between the nodes. A two-pass dynamic programming like method performs the detection optimization process. The measurement function 314 processes the detected CAT component 322 and new image 340 to extract CAT component features 326.

V. Detection Optimization Process

In one embodiment of the invention, the detection optimization process is accomplished by optimizing the CAT model sequentially in a forward and a backward scan. The forward optimization scan of a CAT model starts from the root node and traces down the chains and/or trees in a depth first fashion. The backward optimization scan of a CAT model is merely a reversal of the forward optimization scan from tail node back to the root node.

Figure 4:
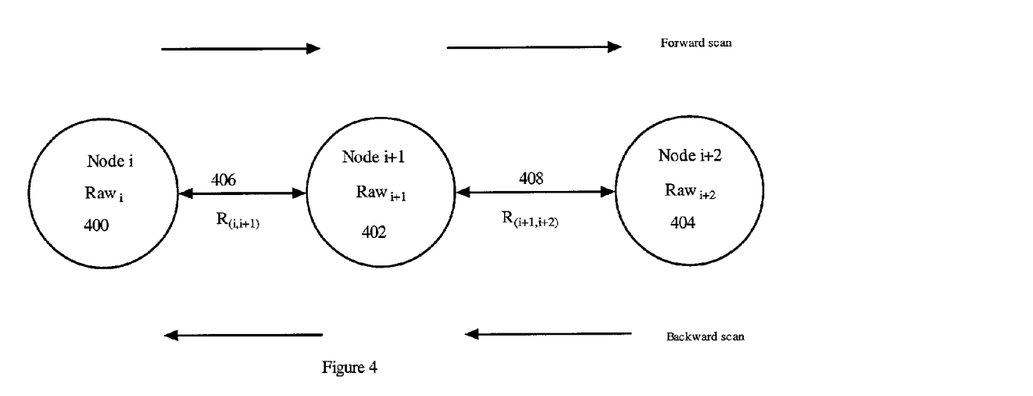
FIG. 4 shows a three node example that illustrates the dual scan detection optimization process.

The detection optimization process executes a constrained estimation method that optimizes the detection results of each component using the relational constraints of all components in a CAT model. The dual scan detection optimization process can be illustrated using a three-node example as shown in FIG. 4.

In this example, $Node_i$ 400 and $Node_{i+1}$ 402 have an associated relationship $R_{(i,i+1)}$ 406; $Node_{i+1}$ 402 and $Node_{i+2}$ 404 have an associated relationship $R_{(i+1,i+2)}$ 408. The forward scan starts from $Node_i$ to $Node_{i+1}$ and then to $Node_{i+2}$. The Backward pass starts from $Node_{i+2}$ to $Node_{i+1}$ and then to $Node_i$. Each node has constraint-free raw data generated from a local detection process for each component independent of the relationships to other components: $Raw_i$, $Raw_{i+1}$, and $Raw_{i+2}$. The raw data includes detected feature values such as edge gradients, line strengths, region texture or density intensities, etc. In one embodiment of the invention, the structure-guided processing method disclosed in Lee, S "Structure-guided image processing and image feature enhancement", U.S. patent application Ser. No. 09/738,846, filed Dec. 15, 2000 and Lee, S, Oh, S "Structure-guided image measurement method", U.S. patent application Ser. No. 09/739,084, filed Dec. 15, 2000 (which are both incorporated in their entirety herein) are used to detect features and generate raw data for each component.

The raw data are refined in the constrained estimation process following a dynamic programming like procedure as follows:

1. Forward Optimization Scan Initialization:

$Raw^f_i = Raw_i$;

$Object_i = Estimate(Raw^f_i)$;

2. Forward Optimization Scan: From k=i+1 to i+2 incremented by 1

$Object^f_k = Estimate(Raw^f_{k-1}, Raw_k, R_{(k-1,k)})$;

$Raw^f_k = Update(Raw_k, Object^f_k)$.

3. Backward Optimization Scan Initialization:

$Raw^{fb}_{i+2} = Raw^f_{i+2}$;

$Object^{fb}_{i+2} = Object^{fb}_{i+2}$.

4. Backward Optimization Scan: From m=i+1 to i decremented by 1

$Object^{fb}_m = Estimate(Raw^{fb}_{m+1}, Raw^f_m, R_{(m,m+1,)})$;

$Raw^{fb}_m = Update(Raw^f_m, Object^{fb}_m)$;

Where $Raw_i$ designates the raw data for a node i, generated from initial local detection; $Object_i$ designates the estimated object mask for a node i. It can be represented by binary object mask. $Raw^f_i$ designates the raw data for node i after forward optimization scan; $Object^f_i$ designates the estimated object mask for node I after forward optimization scan; $Raw^{fb}_i$ designates the raw data for node i after forward and backward optimization scan; $Object^{fb}_i$ designates the estimated object mask for node i after forward and backward optimization scan.

Estimate( ) is the operation that estimates the object from the raw data with or without constraints. The Update( ) is the operation that updates the raw data from an object estimation results. The detailed embodiment of Estimate( ) and Update( ) functions will be described in the following sections.

The forward optimization scan initialization step uses the local detection results as the forward optimization results for node i since no other nodes precede node i in the forward optimization scan. The forward optimization scan step estimates the object for a node k using the forward optimized raw data from the previous node ($Raw^f_{k-1}$) and its local detected raw data, $Raw_k$, as well as the relation between node k and the previous node $R_{(k-1,k)}$. The forward optimized object estimate $Object^f_k$ is used to update the raw data for node k. This results in a forward optimized node k raw data $Raw^f_k$. This process is repeated for the next node.

Similarly, the backward optimization scan initialization step uses the forward detection results as the backward optimization results for node i+2 since no other nodes precede node i+2 in the backward scan. The backward optimization scan step estimates the object for a node m using the backward optimized raw data from the previous node $Raw^{fb}_{m+1}$, and its forward optimized raw data, $Raw^f_m$, as well as the relation between node m and the previous node $R_{(m,m+1,)}$. The backward optimized object estimate $Object^{fb}_m$ is used to update the raw data for node m. This results in a forward and backward optimized node m raw data $Raw^{fb}_m$. This process is repeated for the next node.

The above 3 node optimization procedure can be easily generalized for any CAT models. Assume that there are N+1 nodes in the CAT model and the nodes are ordered following the forward scanning order. $Node_0$ is the root node and $Node_N$ is the end node (last node in a CAT model). The generalized optimization procedure comprises the following steps:

1. Forward Optimization Scan Initialization:

$Raw^f_0 = Raw_0$;

$Object_0 = Estimate(Raw^f_0)$;

2. Forward Optimization Scan: From k=1 to N incremented by 1

$Object^f_k = Estimate(Raw^f_{k-1}, Raw_k, R_{(k-1,k)})$;

$Raw^f_k = Update(Raw_k, Object^f_k)$.

3. Backward Optimization Scan Initialization:

$Raw^{fb}_N = Raw^f_N$;

$Object^{fb}_N = Object^{fb}_N$.

4. Backward Optimization Scan: From m=N to 0 decremented by 1

$Object^{fb}_m = Estimate(Raw^{fb}_{m+1}, Raw^f_m, R_{(m+1,m)})$;

$Raw^{fb}_m = Update(Raw^f_m, Object^{fb}_m)$;

Those having ordinary skill in the art should recognize that other optimization scanning methods can be used. For example, a backward scan can be applied before a forward scan. Or multiple forward and backward scanning combinations can be used. Furthermore, other types of scanning patterns can be used for the optimization process without deviating from the essence of the invention.

V.1 Estimation

The estimation method estimates the object from the raw data with or without constraints. In one embodiment of the invention, the structure-guided estimation method disclosed in "Lee, S., Oh, S., entitled "Structure-guided image measurement method", U.S. patent application Ser. No. 09/739,084, filed Dec. 15, 2000" can be used for estimation.

The structure-guided estimation method performs estimation from the raw data within the regions defined by each component of the CAT node. The estimation is conducted by a weighted minimum-square-error (MSE) method. The estimation finds the parameters that minimize a cost function. The cost function is defined as the weighted square error between the relevant component model representation and all data points of all entities included in the estimation minus a relational constraint term. Estimation without constraint can be performed by removing the relational constraint from the cost function. The entities and relational constraints define the CAT component relations. The corresponding point in the raw data weights each data point during the estimation process.

$$\text{Cost} = \sum_{m \in M} \sum_{i \in C_m} I_{raw}(x_i, y_i)[\text{Model\_Error}(x_i, y_i)]^2 - \text{Relational\_Constraint}(s)$$

Where M is the set of all relevant components included in the estimation and $C_m$ corresponds to the m-th component of the set. $\text{Model}_{13}$ Error function represents the difference between the component model representation and the raw data. $I_{raw}(x_i, y_i)$ is the value of raw data at the $(x_i, y_i)$ pixel location.

Figure 5:
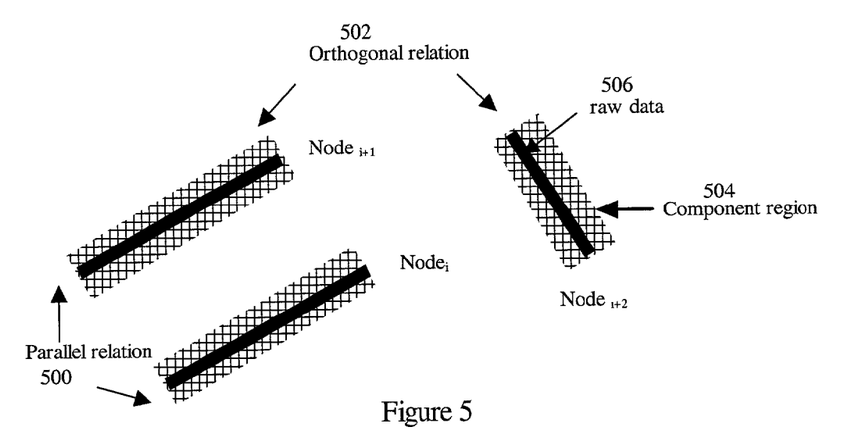
FIG. 5 shows a simple example to illustrate the structure-guided estimation method.

FIG. 5 provides a simple example to illustrate the structure-guided estimation method of this invention. In FIG. 5, $\text{Node}_i$ 400 and $\text{Node}_{i+1}$ 402 and $\text{Node}_{i+2}$ 404 are line segment components. There is a parallel relation 500 between $\text{Node}_i$ and $\text{Node}_{i+1}$. There is an orthogonal relation 502 between $\text{Node}_{i+1}$ and $\text{Node}_{i+2}$.

Each line has a component region mask 504 that defines the regions to perform estimation using the pixel values in the grayscale raw data image 506. The estimation applied to these nodes is line estimation constrained by parallelism and orthogonal relations. A general form for this estimation can be described as follows.

The relational constraint includes two groups of parallel lines L and P. The lines in L and the lines in P are perpendicular to each other as shown in FIG. 5. The cost function is $$\text{Cost} = \sum_{m \in L} \sum_{i \in L_m} w_i[a\ x_i + b\ y_i + c_m]^2 + \sum_{n \in P} \sum_{i \in P_n} w_i[b\ x_i - a\ y_i + c_n]^2$$

A closed form solution exists for determining a, b, $c_m$ and $c_n$ that minimize Cost.

Where a line is represented by a line equation:

$ax+by+c=0$ with the constraint that $a^2+b^2=1$ and $b \geq 0$.

When P is an empty set, only a parallel line constraint exists for a set of lines such as the relationship between $\text{Node}_i$ and $\text{Node}_{i+1}$. This is a degenerate form of the structure constraint of the more general case. When only one line each exists in groups L and P, the constraint becomes the existence of two orthogonal lines. This is another degenerate form of the structure constraint of the more general case. The detailed estimation procedure for lines with different constraints and other structures such as a circle are disclosed in Lee, S., Oh, S., entitled "Structure-guided image measurement method", U.S. patent application Ser. No. 09/739,084, filed Dec. 15, 2000. This optimization process model finds the optimal fitting result with the constraint of the next objects. The biggest problem of this described embodiment is to lose the information accumulated about the previous objects. In other words, the constraint results in this example are locally optimized rather than globally optimized. To reduce this problem, a relaxation method can be used with the optimization. For example, if the sum of accumulated weight up to (n−1)th object is W[n−1] and the sum of the weight in nth object is w[n], the cost function of the relaxed version is defined as $\text{CostR}=(W[n-1]/W[n])*(p(n-1)-pp(n-1))*])*(p(n-1)-pp(n-1))+(w[n]/W[n])*\text{cost}(n-1,n)$ Where CostR is the cost of the relaxed version, cost(n−1,n) is the cost function without relaxed version between nth and n−1th objects, p(n) is the optimized parameters (for example a,b, and c in line) of the nth object, and pp(n) is the optimized parameter until the previous procedure.

V.2 Update

The update method updates the raw data from an object estimation result. The method is related to the robust estimation method disclosed in Oh, S., Lee, S. entitled "Robust method for Image Feature Estimation", U.S. patent application Ser. No. 09/871,991, filed May 31, 2001.

Figure 6:
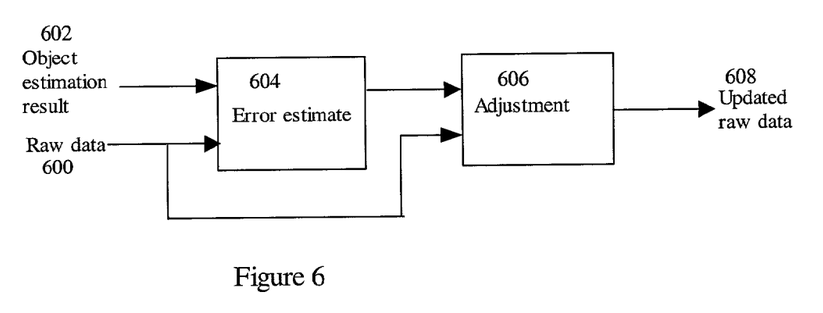
FIG. 6 shows the processing flow of the update method.

The processing flow of the update method is depicted in FIG. 6. The raw data 600 and the object estimation results 602 are compared to generate an error estimate 604. The error estimate is used to adjust the raw data through an adjustment step 606 to produce updated raw data 608.

V.2.1 Error Estimate

In one embodiment of the invention, the error estimate for a point $(x_i, y_i)$, herein denoted $e(x_i, y_i)$, is the $[\text{Model\_Error}(x_i, y_i)]^2$ used in the cost function for estimation. For example, the error estimate is $e(x_i, y_i)=[a\ x_{i+b\ yi}+c_m]^2$ for an estimated line of $ax+by+c_m$. The gross error for a component m to be updated can be calculated as $$\text{Error}_m = \frac{\sum_{i \in C_m} I_{raw}(x_i, y_i)[\text{Model\_Error}(x_i, y_i)]^2}{\sum_{i \in C_m} I_{raw}^2(x_i, y_i)}$$

V.2.2 Adjustment

Figure 7:
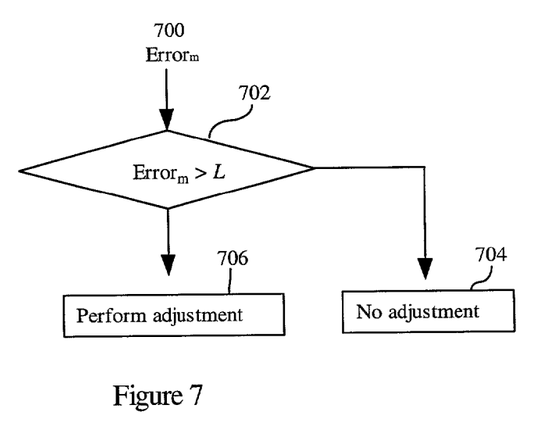
FIG. 7 shows the adjustment process decision logic for a component m that is to be updated.

The adjustment process decision logic is shown in FIG. 7. The adjustment process checks the gross error 700 of the component to be updated. If the gross error is greater than a limit L 702, a potential defective condition is encountered.

In this case, no adjustment 704 will be performed to avoid the corruption of the results by defective components. That is, $$I_{raw}^{new}(x,y) = I_{raw}^{old}(x,y)$$

When the gross error is smaller than the limit, the update function modifies the pixel values of the raw image 706. If the error is large, the updated raw value becomes smaller to reduce the intensity of the pixels whose feature values do not match the estimated object. This results in a refined raw image that is closer to the estimated object for the component. Since the object estimation involves the constraint of multiple components, the adjustment improves the consistency of raw images among multiple components.

In one embodiment of the invention, the raw image value is adjusted by the multiplication of an adjustment factor. The adjustment factor is a non-increasing function of the error. This can be described mathematically as follows, $$I_{raw}^{new}(x,y) = I_{raw}^{old}(x,y) * r(e(x,y);T)$$

where $r(z;T)$ is a non-increasing function. In one embodiment of the invention, $$r(z;T) = \exp(-|z|/T)$$

is used. In another embodiment of the invention, $$r(z;T) = \exp\left(-\frac{z^2}{T^2}\right)$$

is used. In a third embodiment of the invention, $$r(z;T) = \frac{1}{1 + (z/T)^2}$$

is used. Those having ordinary skill in the art should recognize that other nonlinear or linear functions can be used for $r(z;T)$.

The parameter T in the above functions determines the influence of the constrained optimization process. Large T lowers the influence and small T increases the influence of the constrained optimization.

VI. Defect detection

The detection optimization process updates the raw detection results for each component using the constraints of all components. The local raw data and optimized raw data can be compared to detect defects. Two types of defects can be detected: gross defect and local defect. In one embodiment of the invention, gross defect is detected as part of the update process. When gross error in the adjustment process as described in V.2.2. is greater than a limit L, a gross defect is detected.

Local defect is detected if a significant difference exists between $I_{raw}^{local}$ and $I_{raw}^{optimized}$. In one embodiment of the invention, a difference measure for a component m is calculated as:

$$\text{Difference}_m = \frac{\sum_{i \in C_m}[I_{raw}^{local}(x_i, y_i) - I_{raw}^{optimized}(x_i, y_i)]^2}{\sum_{i \in C_m} I_{raw}^2(x_i, y_i)}.$$

A local defect is detected on component m if the Difference$_m$ is greater than a threshold. Those having ordinary skill of the art should recognize that other difference measurement such as using an absolute difference rather than a squared difference can be used to detect local defects.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A detection optimization method using a multilevel Chain-And-Tree model comprises the following steps:
    (a) Performing a forward optimization scan initialization using the root node;
    (b) Performing a forward optimization scan for each node using the detections and relations from its preceding nodes having at least one forward optimized result output;
    (c) Performing a backward optimization scan initialization using the end node;
    (d) Performing a backward optimization scan for each node using the detections and relations from its descending nodes having at lcast one backward optimized result output.

2. The method of claim 1 further comprises a defect detection step.

3. The method of claim 2 wherein the defect detection step includes gross defect detection.

4. The method of claim 2 wherein the defect detection step includes local defect detection.

5. The method of claim 1 wherein the forward optimization scan for each node comprises:
    (a) Performing local detection for the current component having a current component raw data output;
    (b) Performing an estimation using the previous component forward optimized raw data, the current component raw data and their relationship having a forward optimized current component object detection result output;
    (c) Performing an update for the current component raw data using the forward optimized current component object detection result having a forward optimized current component raw data output.

6. The method of claim 5 wherein the estimation uses a structure-guided estimation method that optimizes a cost function.

7. The method of claim 5 wherein the update comprises error estimation and at least one adjustment step.

8. The method of claim 7 wherein the adjustment step performs no adjustment when the gross error is greater than a limit.

9. The method of claim 1 wherein the backward optimization scan for each node further comprises
   (a) Performing an estimation using the previous component backward optimized raw data, the current component raw data and their relationship having a backward optimized current component object detection result output;
   (b) Performing an update for the current component raw data using the backward optimized current component object detection result having a backward optimized current component raw data output.

* * * * *